(12) United States Patent
Frenkel et al.

(10) Patent No.: US 8,756,436 B2
(45) Date of Patent: *Jun. 17, 2014

(54) SECURE ARCHIVE

(75) Inventors: Lior Frenkel, Misgav Dov (IL); Amir Zilberstein, Yad Rambam (IL)

(73) Assignee: Waterfall Security Solutions Ltd., Rosh Haayin (IL)

( * ) Notice: Subject to any disclaimer, the term of this patent is extended or adjusted under 35 U.S.C. 154(b) by 120 days.

This patent is subject to a terminal disclaimer.

(21) Appl. No.: 12/447,470

(22) PCT Filed: Jan. 16, 2008

(86) PCT No.: PCT/IL2008/000070
§ 371 (c)(1),
(2), (4) Date: Apr. 28, 2009

(87) PCT Pub. No.: WO2008/087640
PCT Pub. Date: Jul. 24, 2008

(65) Prior Publication Data
US 2010/0275039 A1    Oct. 28, 2010

(30) Foreign Application Priority Data
Jan. 16, 2007 (IL) .......................................... 180748

(51) Int. Cl.
*H04L 29/06* (2006.01)
(52) U.S. Cl.
USPC ........................................................ 713/193
(58) Field of Classification Search
USPC .............................. 713/193; 380/277; 711/163
See application file for complete search history.

(56) References Cited

U.S. PATENT DOCUMENTS

| | | | |
|---|---|---|---|
| 4,985,919 A | | 1/1991 | Naruse et al. |
| 4,987,595 A | * | 1/1991 | Marino et al. ................ 713/164 |
| 5,388,212 A | | 2/1995 | Grube et al. |
| 5,530,758 A | * | 6/1996 | Marino et al. ................ 713/150 |
| 5,548,646 A | | 8/1996 | Aziz et al. |
| 5,677,952 A | * | 10/1997 | Blakley et al. ................ 713/189 |
| 5,696,822 A | | 12/1997 | Nachenberg |
| 5,732,278 A | * | 3/1998 | Furber et al. .................... 712/41 |
| 5,822,435 A | | 10/1998 | Boebert et al. |
| 5,825,879 A | | 10/1998 | Davis |
| 5,835,726 A | | 11/1998 | Shwed et al. |

(Continued)

FOREIGN PATENT DOCUMENTS

| | | |
|---|---|---|
| EP | 1632833 A2 | 3/2006 |
| GB | 2267986 A | 12/1993 |

(Continued)

OTHER PUBLICATIONS

Einey, D., "Waterfall IP Surveillance Enalber", Jul. 2007.

(Continued)

*Primary Examiner* — David García Cervetti
(74) *Attorney, Agent, or Firm* — D. Kligler I.P. Services Ltd.

(57) ABSTRACT

Storage apparatus (20) includes a memory (30) and an encryption processor (28), which is configured to receive and encrypt data transmitted from one or more computers (24) for storage in the memory. A one-way link (32) couples the encryption processor to the memory so as to enable the encryption processor to write the encrypted data to the memory but not to read from the memory.

20 Claims, 1 Drawing Sheet

(56) References Cited

U.S. PATENT DOCUMENTS

| | | | |
|---|---|---|---|
| 5,940,507 A * | 8/1999 | Cane et al. | 713/165 |
| 5,946,399 A * | 8/1999 | Kitaj et al. | 713/189 |
| 5,995,628 A * | 11/1999 | Kitaj et al. | 713/164 |
| 6,023,570 A | 2/2000 | Tang et al. | |
| 6,049,611 A | 4/2000 | Tatebayashi et al. | |
| 6,134,661 A | 10/2000 | Topp | |
| 6,240,514 B1 | 5/2001 | Inoue et al. | |
| 6,289,377 B1 | 9/2001 | Lalwaney et al. | |
| 6,311,272 B1 | 10/2001 | Gressel | |
| 6,317,831 B1 | 11/2001 | King | |
| 6,442,607 B1 | 8/2002 | Korn et al. | |
| 6,470,449 B1 * | 10/2002 | Blandford | 713/178 |
| 6,574,651 B1 * | 6/2003 | Stahl | 707/661 |
| 6,601,126 B1 * | 7/2003 | Zaidi et al. | 710/305 |
| 6,615,244 B1 * | 9/2003 | Singhal | 709/213 |
| 6,643,701 B1 | 11/2003 | Aziz et al. | |
| 6,738,388 B1 | 5/2004 | Stevenson et al. | |
| 6,738,742 B2 | 5/2004 | Badt et al. | |
| 6,758,404 B2 | 7/2004 | Ladyansky | |
| 6,915,435 B1 * | 7/2005 | Merriam | 726/5 |
| 6,931,549 B1 * | 8/2005 | Ananda | 726/26 |
| 6,957,330 B1 * | 10/2005 | Hughes | 713/163 |
| 6,963,817 B2 | 11/2005 | Ito et al. | |
| 6,966,001 B2 * | 11/2005 | Obara et al. | 726/26 |
| 6,970,183 B1 | 11/2005 | Monroe | |
| 6,986,061 B1 | 1/2006 | Kunzinger | |
| 7,031,322 B1 | 4/2006 | Matsuo | |
| 7,062,587 B2 * | 6/2006 | Zaidi et al. | 710/305 |
| 7,069,437 B2 | 6/2006 | Williams | |
| 7,100,048 B1 | 8/2006 | Czajkowski et al. | |
| 7,143,289 B2 | 11/2006 | Denning et al. | |
| 7,171,566 B2 * | 1/2007 | Durrant | 713/189 |
| 7,200,693 B2 * | 4/2007 | Jeddeloh | 710/22 |
| 7,234,158 B1 | 6/2007 | Guo et al. | |
| 7,254,663 B2 * | 8/2007 | Bartley et al. | 710/305 |
| 7,260,833 B1 | 8/2007 | Schaeffer | |
| 7,324,515 B1 | 1/2008 | Chapman | |
| 7,366,894 B1 | 4/2008 | Kallimuthu et al. | |
| 7,523,856 B2 | 4/2009 | Block et al. | |
| 7,581,097 B2 | 8/2009 | Catherman et al. | |
| 7,631,189 B2 | 12/2009 | Ichinose et al. | |
| 7,660,959 B2 * | 2/2010 | Asher et al. | 711/164 |
| 7,675,867 B1 | 3/2010 | Mraz et al. | |
| 7,685,436 B2 * | 3/2010 | Davis et al. | 713/192 |
| 7,685,636 B2 | 3/2010 | Leake et al. | |
| 7,698,470 B2 * | 4/2010 | Ruckerbauer et al. | 710/14 |
| 7,716,467 B1 | 5/2010 | Deffet et al. | |
| 7,757,074 B2 | 7/2010 | Sundarrajan et al. | |
| 7,761,704 B2 * | 7/2010 | Ho et al. | 713/158 |
| 7,792,300 B1 * | 9/2010 | Caronni | 380/277 |
| 7,814,316 B1 * | 10/2010 | Hughes et al. | 713/160 |
| 7,815,548 B2 * | 10/2010 | Barre et al. | 482/9 |
| 7,845,011 B2 * | 11/2010 | Hirai | 726/26 |
| 7,849,330 B2 * | 12/2010 | Osaki | 713/193 |
| 7,992,209 B1 | 8/2011 | Menoher et al. | |
| 8,041,832 B2 | 10/2011 | Hughes et al. | |
| 8,046,443 B2 | 10/2011 | Parker et al. | |
| 2001/0033332 A1 | 10/2001 | Kato et al. | |
| 2002/0065775 A1 * | 5/2002 | Monaghan | 705/43 |
| 2002/0066018 A1 | 5/2002 | Linnartz | |
| 2002/0077990 A1 | 6/2002 | Ryan | |
| 2002/0114453 A1 | 8/2002 | Bartholet et al. | |
| 2002/0174010 A1 | 11/2002 | Rice | |
| 2002/0178370 A1 | 11/2002 | Gurevich et al. | |
| 2002/0188862 A1 | 12/2002 | Trethewey et al. | |
| 2002/0191866 A1 | 12/2002 | Tanabe | |
| 2002/0199181 A1 | 12/2002 | Allen | |
| 2003/0005295 A1 | 1/2003 | Girard | |
| 2003/0037247 A1 * | 2/2003 | Obara et al. | 713/193 |
| 2003/0055792 A1 | 3/2003 | Kinoshita et al. | |
| 2003/0061505 A1 | 3/2003 | Sperry et al. | |
| 2003/0114204 A1 | 6/2003 | Allen et al. | |
| 2003/0140090 A1 | 7/2003 | Rezvani et al. | |
| 2003/0140239 A1 * | 7/2003 | Kuroiwa et al. | 713/193 |
| 2003/0159029 A1 | 8/2003 | Brown et al. | |
| 2003/0188102 A1 * | 10/2003 | Nagasoe et al. | 711/114 |
| 2003/0217262 A1 | 11/2003 | Kawai et al. | |
| 2004/0022107 A1 * | 2/2004 | Zaidi et al. | 365/202 |
| 2004/0024710 A1 | 2/2004 | Fernando et al. | |
| 2004/0070620 A1 | 4/2004 | Fujisawa | |
| 2004/0071311 A1 | 4/2004 | Choi et al. | |
| 2004/0080615 A1 | 4/2004 | Klein et al. | |
| 2004/0125077 A1 | 7/2004 | Ashton | |
| 2004/0175123 A1 | 9/2004 | Lim et al. | |
| 2004/0217890 A1 | 11/2004 | Woodward et al. | |
| 2004/0247308 A1 | 12/2004 | Kawade | |
| 2005/0015624 A1 | 1/2005 | Ginter et al. | |
| 2005/0033990 A1 | 2/2005 | Harvey et al. | |
| 2005/0057774 A1 | 3/2005 | Maruyama | |
| 2005/0066186 A1 | 3/2005 | Gentle et al. | |
| 2005/0085964 A1 | 4/2005 | Knapp et al. | |
| 2005/0091173 A1 | 4/2005 | Alve | |
| 2005/0119967 A1 * | 6/2005 | Ishiguro et al. | 705/38 |
| 2005/0120214 A1 | 6/2005 | Yeates et al. | |
| 2005/0120251 A1 * | 6/2005 | Fukumori | 713/300 |
| 2005/0138369 A1 | 6/2005 | Lebovitz et al. | |
| 2005/0165939 A1 | 7/2005 | Nikunen et al. | |
| 2005/0216648 A1 * | 9/2005 | Jeddeloh | 710/311 |
| 2005/0264415 A1 | 12/2005 | Katz | |
| 2006/0026292 A1 | 2/2006 | Namioka et al. | |
| 2006/0047887 A1 * | 3/2006 | Jeddeloh | 711/100 |
| 2006/0064550 A1 * | 3/2006 | Katsuragi et al. | 711/141 |
| 2006/0085354 A1 * | 4/2006 | Hirai | 705/59 |
| 2006/0085534 A1 | 4/2006 | Ralston et al. | |
| 2006/0095629 A1 * | 5/2006 | Gower et al. | 710/305 |
| 2006/0136724 A1 | 6/2006 | Takeshima et al. | |
| 2006/0161791 A1 | 7/2006 | Bennett | |
| 2006/0165347 A1 | 7/2006 | Mita | |
| 2006/0179258 A1 * | 8/2006 | Jeddeloh | 711/100 |
| 2006/0220903 A1 | 10/2006 | Zigdon et al. | |
| 2006/0242423 A1 | 10/2006 | Kussmaul | |
| 2006/0259431 A1 * | 11/2006 | Poisner | 705/51 |
| 2006/0271617 A1 | 11/2006 | Hughes et al. | |
| 2007/0028027 A1 * | 2/2007 | Janzen et al. | 711/5 |
| 2007/0028134 A1 | 2/2007 | Gammel et al. | |
| 2007/0043769 A1 * | 2/2007 | Kasahara et al. | 707/104.1 |
| 2007/0055814 A1 * | 3/2007 | Jeddeloh | 711/100 |
| 2007/0063866 A1 | 3/2007 | Webb | |
| 2007/0094430 A1 | 4/2007 | Speier et al. | |
| 2007/0112863 A1 * | 5/2007 | Niwata et al. | 707/200 |
| 2007/0180263 A1 | 8/2007 | Delgrosso et al. | |
| 2007/0180493 A1 | 8/2007 | Croft et al. | |
| 2007/0203970 A1 | 8/2007 | Nguyen | |
| 2007/0258595 A1 | 11/2007 | Choy | |
| 2007/0283297 A1 * | 12/2007 | Hein et al. | 716/1 |
| 2008/0005325 A1 | 1/2008 | Wynn et al. | |
| 2008/0008207 A1 | 1/2008 | Kellum | |
| 2008/0059379 A1 | 3/2008 | Ramaci et al. | |
| 2008/0065837 A1 | 3/2008 | Toyonaga et al. | |
| 2008/0066192 A1 * | 3/2008 | Greco et al. | 726/32 |
| 2008/0082835 A1 * | 4/2008 | Asher et al. | 713/193 |
| 2008/0120511 A1 | 5/2008 | Naguib | |
| 2008/0144821 A1 | 6/2008 | Armstrong | |
| 2008/0155273 A1 * | 6/2008 | Conti | 713/190 |
| 2008/0209216 A1 | 8/2008 | Kelly et al. | |
| 2008/0244743 A1 | 10/2008 | Largman et al. | |
| 2008/0263672 A1 | 10/2008 | Chen et al. | |
| 2008/0288790 A1 | 11/2008 | Wilson | |
| 2009/0002150 A1 | 1/2009 | Zilberstein et al. | |
| 2009/0019325 A1 * | 1/2009 | Miyamoto et al. | 714/702 |
| 2009/0300368 A1 | 12/2009 | Zilberstein et al. | |
| 2010/0180120 A1 | 7/2010 | Frenkel et al. | |
| 2010/0278339 A1 | 11/2010 | Frenkel et al. | |
| 2010/0324380 A1 | 12/2010 | Perkins et al. | |
| 2011/0202772 A1 | 8/2011 | Frenkel et al. | |
| 2011/0213990 A1 * | 9/2011 | Poisner | 713/193 |
| 2011/0258690 A1 | 10/2011 | Gaffan et al. | |

FOREIGN PATENT DOCUMENTS

| | | | |
|---|---|---|---|
| GB | 2371125 A | 7/2002 | |
| WO | 9526085 A1 | 9/1995 | |
| WO | 0110079 A1 | 2/2001 | |
| WO | 01/63879 A1 | 8/2001 | |

(56) References Cited

FOREIGN PATENT DOCUMENTS

| WO | 2008001344 A2 | 1/2008 |
|---|---|---|
| WO | 2008026212 A2 | 3/2008 |
| WO | 2008087640 A2 | 7/2008 |
| WO | 2009004611 A2 | 1/2009 |
| WO | 2009053990 A2 | 4/2009 |

OTHER PUBLICATIONS

Waterfall Security Solutions Ltd., "Waterfall One Way Link Technology", 2008 http://www.waterfall-solutions.com/home/Waterfall_Technology.aspx.
Multi-State Information Sharing Analysis Center (MSISAC), "Cyber Security Procurement Language for Control Systems", version 1.8, revision 3, Feb. 2008 http://www.msisac.org/scada/documents/4march08scadaprocure.pdf.
International Application PCT/IL2008/000886 Search Report dated Nov. 13, 2008.
International Application PCT/IL2008/000070 Search Report dated Jun. 16, 2008.
International Application PCT/IL2007/001070 Search Report dated Jul. 25, 2008.
Axis Communications., "Axis Network Cameras", 2008 http://www.axis.com/products/video/camera/index.htm.
International Application PCT/IL2006/001499 Search Report dated Apr. 8, 2008.
International Application PCT/IL2006/001499 Patentability Report dated Mar. 19, 2009.
International Application PCT/IL2007/001070 Patentability Report dated Mar. 16, 2009.
International Application PCT/IL2008/001513 Search Report dated Mar. 10, 2009.
Check Point Software Technologies Ltd., "Extended Unified Threat Management capabilities with new multi-layer messaging security deliver best all-inclusive security solution", USA, Nov. 18, 2008 http://www.checkpoint.com/press/2008/utm-1-edge-upgrade-111808.html.
Innominate Security Technologies, "Press Release: Innominate joins Industrial Defender Enabled Partner Program", Germany, Apr. 14, 2008 http://www.innominate.com/content/view/288/120/lang,en/.
U.S. Appl. No. 11/823,950 Official Action dated Jun. 22, 2009.
IL Patent Application # 177,756 Official Action dated Aug. 17, 2010.
IL Patent Application # 180,748 Official Action dated Oct. 25, 2010.
Israel Patent Application # 201473 Official Action dated May 8, 2011.
U.S. Appl. No. 11/977,391 Official Action dated Jun. 14, 2011.
Frenkel, L., "Unidirectional Information Transfer", Web issue, Jun. 2005.
U.S. Appl. No. 12/306,692 Official Action dated Sep. 28, 2011.
U.S. Appl. No. 12/306,692 Official Action dated Feb. 13, 2012.
U.S. Appl. No. 12/438,548 Official Action dated Mar. 6, 2012.
European Patent Application # 07805530.8 Search report dated Mar. 6, 2012.
EP Patent Application # 08702651.4 Search report dated May 11, 2012.
U.S. Appl. No. 12/480,692 Official Action dated May 10, 2012.
U.S. Appl. No. 12/518,276 Official Action dated Apr. 23, 2012.
U.S. Appl. No. 12/438,548 Office Action dated Jul. 11, 2013.
Schneier, B., "Applied Cryptography", Chapter 15, pp. 357-358, published by John Wiley & Sons, Inc, year 1996.
U.S. Appl. No. 12/676,143 Official Action dated Jul. 13, 2012.
European Patent Application # 07849562.9 Extended Search Report dated Jun. 8, 2011.
European Patent Application # 09162276.1 Examination Report dated Apr. 15, 2011.
Israel Patent Application # 186473 Official Action dated Jun. 12, 2011.
Israel Patent Application # 185795 Official Action dated May 5, 2011.
U.S. Appl. No. 12/518,276 Official Action dated Apr. 5, 2011.
European Patent Application EP09162276 Search Report dated Aug. 9, 2010.
International Application PCT/IB2009/055396 Search Report dated Jul. 13, 2010.
Israel Patent Application # 180020 Office Action dated Sep. 13, 2010.
International Application PCT/IB2009/054541 Search Report dated Feb. 25, 2010.
Dierks, T., "The TLS Protocol", version 1.0, RFC 2246, Networking group of IETF, Jan. 1999.
International Application PCT/IB2007/001535 Search Report dated Jun. 17, 2008.
International Application PCT/IB2008/001187 Search Report dated Jan. 23, 2009.
U.S. Appl. No. 12/480,692 Official Action dated Nov. 9, 2012.
U.S. Appl. No. 12/676,143 Official Action dated Oct. 25, 2012.
U.S. Appl. No. 12/438,548 Official Action dated Feb. 22, 2013.
U.S. Appl. No. 13/487,265 Office Action filed Nov. 22, 2013.
U.S. Appl. No. 13/487,265 Office Action filed Mar. 6, 2014.
EP Patent Application # 13182696.8 Search Report dated Apr. 3, 2014.

* cited by examiner

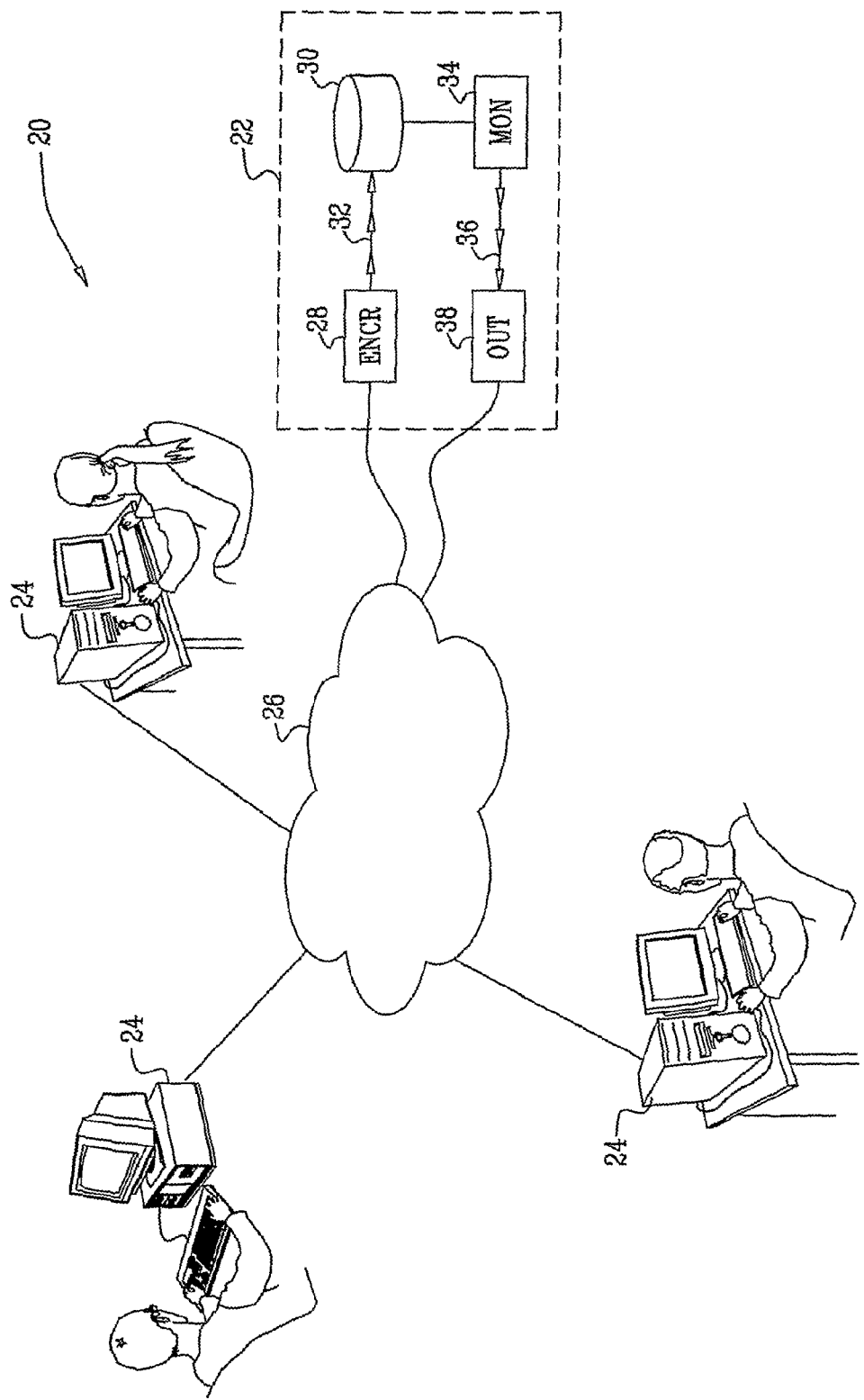

SECURE ARCHIVE

FIELD OF THE INVENTION

The present invention relates generally to computer systems, and specifically to systems and methods for data communication and storage.

BACKGROUND OF THE INVENTION

In a computer network handling sensitive data, such as data in military or financial environments, portions of the network may be connected by one-way data links. For example, confidential data that must not be accessed from external sites may be stored on a computer that is configured to receive data over a one-way link and has no physical outgoing link over which data might be transmitted to the external site.

One-way links may be implemented, for example, using Waterfall™ systems, which are manufactured by Gita Technologies, Ltd. (Rosh HaAyin, Israel). The Waterfall system provides a physical one-way connection based on fiberoptic communication, using an underlying proprietary transfer protocol. When a transmitting computer is connected by a Waterfall system (or other one-way link) to a receiving computer, the receiving computer can receive data from the transmitting computer but has no means of sending any return communications to the transmitting computer.

SUMMARY OF THE INVENTION

Networked computing systems, such as enterprise computer networks, often use centralized storage for archiving of data, such as transaction logs, information technology (IT) system events, and backups. Maintaining the integrity of such archives is crucial in order to ensure that functions such as log analysis, audits, forensics, and data recovery after system failures can be carried out. It is also necessary to prevent unauthorized parties from accessing sensitive archived data.

The embodiments of the present invention that are described hereinbelow address these needs by providing a secure storage system, in which computers on a network can write data to a memory only via an encryption processor. (The term "memory" is used broadly in the present patent application and in the claims to refer to any sort of data storage medium.) The processor encrypts the data using an encryption key, which typically is not available to the source computers, and conveys the encrypted data over a one-way link to the memory. Thus, the encryption processor is able to write encrypted data to the memory but not to read from the memory.

Since all data written to the memory are encrypted, any malicious program code that a hacker may attempt to introduce into the storage system is scrambled and therefore rendered harmless until it is decrypted. Decryption may take place in a controlled, "sterile" environment, in which malicious code can be detected and neutralized before it affects vulnerable network elements. For example, the storage contents may be duplicated and then decrypted in an environment that is separate from the storage system, so that any damage that may be caused by malicious code will not affect the original stored data.

There is therefore provided, in accordance with an embodiment of the present invention, storage apparatus, including:

a memory;

an encryption processor, which is configured to receive and encrypt data transmitted from one or more computers for storage in the memory; and a one-way link, coupling the encryption processor to the memory so as to enable the encryption processor to write the encrypted data to the memory but not to read from the memory.

In some embodiments, the encryption processor is configured to encrypt the data using an encryption key that is not available to the one or more computers. In one embodiment, for each transmission of the data from the one or more computers, the encryption processor is configured to select the encryption key from among a plurality of possible encryption keys, and to convey an indication of the selected encryption key to the memory in addition to the encrypted data.

Typically, the memory is configured to store the encrypted data without decryption prior to storage.

In a disclosed embodiment, the encryption processor is configured to receive the data from the one or more computers over a network and to apply a time stamp to each of at least some items of the data that are written to the memory.

In some embodiments, the apparatus includes a monitoring processor, which is coupled to the memory so as to generate an indication of a status of the data stored in the memory, and a further one-way link, coupling the monitoring processor to at least one of the computers so as to enable the monitoring processor to convey the indication of the status to the at least one of the computers but not to receive inputs from the one or more computers.

There is also provided, in accordance with an embodiment of the present invention, a method for data storage, including:

receiving data transmitted from one or more computers for storage in a memory;

encrypting the received data using an encryption processor before passing the data to the memory;

conveying the encrypted data from the encryption processor to the memory over a one-way link, which permits the encryption processor to write the encrypted data to the memory but not to read from the memory; and storing the encrypted data in the memory.

The present invention will be more fully understood from the following detailed description of the embodiments thereof, taken together with the drawings in which:

BRIEF DESCRIPTION OF THE DRAWINGS

FIG. 1 is a block diagram that schematically illustrates a system for data transmission and storage, in accordance with an embodiment of the present invention.

DETAILED DESCRIPTION OF EMBODIMENTS

FIG. 1 is a block diagram that schematically illustrates a system 20 for data transmission and storage, in accordance with an embodiment of the present invention. Computers 24 in system 20 write data to a secure archive 22 via a computer network 26. These data may comprise, for example, transaction logs or other data logging entries, database updates, file backups, or substantially any other type of data that may be subject to archiving. Network 26 may comprise substantially any sort of private or public network. (In an alternative embodiment, not shown in the figures, archive 22 may be connected by a single link rather than through a multi-computer network.) Even when access to network 26 is carefully controlled, however, unauthorized users may still be able to gain access to the network. Such users may attempt to introduce malicious program code into archive 22 in order to read data stored in the archive or to corrupt the contents of the archive. For example, an attacker who has hacked into the network might try to erase or alter the IT system log in order to cover his tracks.

Archive 22 comprises an encryption processor 28, which writes encrypted data to a memory 30 via a one-way link 32. Computers on network 26 are able to write data to memory 30 only via the encryption processor. Therefore, any malicious program code that a user may attempt to introduce into archive 22 will be scrambled by encryption and will simply be stored in scrambled form in memory 30. Consequently, the user will be unable to cause the control unit of memory 30 to perform any action other than simply writing data to the memory, since any program instructions submitted by the user will be rendered unintelligible by the encryption.

Encryption processor 28 may comprise either dedicated hardware or a general-purpose, software-driven computer processor, or a combination of hardware and software elements. For rapid encryption, as well as enhanced security, for example, the encryption processor may comprise one or more gate arrays with suitable firmware and/or an application-specific integrated circuit (ASIC). If a general-purpose computer processor is used, the software for carrying out the functions described herein may be downloaded to the processor over a network, or it may be alternatively provided on tangible media, such as optical, magnetic, or electronic memory media.

The encryption processor may use any suitable sort of encryption that is known in the art, including both asymmetric encryption methods, such as the RSA (Rivest Shamir Adelman) algorithm, and symmetric methods, such as the DES (Data Encryption Standard) and AES (Advanced Encryption Standard) algorithms, as well as simpler methods, which are sometimes referred to as "scrambling." In encrypting incoming data, the encryption processor typically uses different keys at different times, and may use a key that is not available to computers outside archive 22. Because of the changing keys, hackers are prevented from using a known key to prepare their transmissions in such a way as to have malicious effect after encoding. Typically, the encryption processor chooses the key for each data item or group of data items using a pseudo-random process, either by selection from a list that was prepared in advance, or by pseudo-random generation. (Alternatively, the key may be chosen deterministically, as long as it is not known or available to the sending computer.) The key may be of any suitable length, depending on the encryption algorithm that is used.

Encryption processor 28 transmits the encrypted data over one-way link 32 to memory 30. Assuming that the encryption processor uses different encryption keys at different times, the encryption processor may also transmit to the memory an indication of the key that is to be used to decrypt each transmission. The indication may comprise either the key itself or an index to a predetermined list of keys. Optionally, either the encryption processor or the memory controller (or both) may add a time-stamp to each item of data, in order to facilitate audit functions. Alternatively or additionally, the time stamp may be applied by a dedicated hardware unit.

One-way link 32 may comprise a Waterfall link, as described in the Background section above, or any other suitable type of one-way link that is known in the art. As noted above, this link is typically physically configured so as to permit data transmission in only one direction, from processor 28 to memory 30. Optionally, link 32 may comprise two or more one-way links connected in series, with a data security engine placed between the one-way links. This link configuration, which provides enhanced security, is described, for example, in PCT Patent Application PCT/IL2006$_{[DK1]}$/ 001499, filed Dec. 28, 2006, which is assigned to the assignee of the present patent application and whose disclosure is incorporated herein by reference.

Memory 30 may comprise any suitable type of storage device, such as magnetic, optical, or electronic memory, or a combination of these memory types. The storage device may comprise a control unit (not shown), as is known in the art, which receives the encrypted data over link 32 and writes the data to appropriate locations in the memory. As noted above, however, the control unit does not attempt to decrypt the data before writing. Rather, the data are typically decrypted and "sterilized" offline, as needed, by a separate decryption processor (not shown). To decrypt the data, this processor uses the key that was indicated by the encryption processor, as explained above. After decryption, the decryption processor sterilizes the data in order to detect and neutralize any malicious content, such as viruses, worms and spyware, for example. Methods that can be used for encryption and decryption of potentially-malicious data transmissions are described in greater detail in PCT Patent Application PCT/IL2007/001070, $_{[DK2]}$ filed Aug. 29, 2007, which is assigned to the assignee of the present patent application and whose disclosure is incorporated herein by reference.

Some archiving applications may require archive 22 to return an acknowledgment or other status indicator to one or more of computers 24 after receiving data from the computer. Simple data acknowledgments may be returned by encryption processor 28. Alternatively or additionally, an optional monitoring processor 34 may monitor the status of memory 30 and report on data storage status. Typically, the monitoring processor is pre-programmed to carry out these functions and performs the functions without receiving explicit commands to do so from computers on network 26. Monitoring processor 34 conveys the reports via a one-way link 36 to an output interface 38, which then transmits the reports to the appropriate computer 24 on network 26. In this configuration, computers 24 are unable to send inputs, such as data or commands, to the monitoring processor, and are thus prevented from introducing malicious program code that could cause this processor to retrieve and transmit confidential data from memory 30 or otherwise tamper with the contents of the memory.

Although FIG. 1 shows a certain configuration of system 20 and particularly of the elements in archive 22, the principles of the present invention may similarly be applied in other sorts of physical configurations. For example, links 32 and 36 may be combined in a single package with appropriate connections and switching to ensure that data flows over the links only in the directions and operational modes that are described above. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. Storage apparatus, comprising:
an archive memory centrally archiving data for a plurality of computers;
an encryption processor, which is configured to receive and encrypt data transmitted from one or more computers for storage in the archive memory; and a one-way link, coupling the encryption processor to the archive memory so as to enable the encryption processor to write the encrypted data to the memory but not to read from the memory, wherein the one-way link is physically configured so as to permit data transmission in only one direction, from the processor to the memory, and wherein the memory and the encryption processor are connected in a manner allowing direct transmission only from the encryption processor to the memory, and not from the memory to the encryption processor.

2. The apparatus according to claim 1, wherein the encryption processor is configured to encrypt the data using an encryption key that is not available to the one or more computers.

3. The apparatus according to claim 2, wherein for each transmission of the data from the one or more computers, the encryption processor is configured to select the encryption key from among a plurality of possible encryption keys, and to convey an indication of the selected encryption key to the memory in addition to the encrypted data.

4. The apparatus according to claim 1, wherein the memory is configured to store the encrypted data without decryption prior to storage.

5. The apparatus according to claim 1, wherein the encryption processor is configured to receive the data from the one or more computers over a network.

6. The apparatus according to claim 1, wherein the encryption processor is configured to apply a time stamp to each of at least some items of the data that are written to the memory.

7. The apparatus according to claim 1, and comprising:
a monitoring processor, which is coupled to the memory so as to generate an indication of a status of the data stored in the memory; and
a further one-way link, coupling the monitoring processor to at least one of the computers so as to enable the monitoring processor to convey the indication of the status to the at least one of the computers but not to receive inputs from the one or more computers.

8. The apparatus according to claim 1, wherein the memory and the encryption processor are connected directly only by the one way link.

9. The apparatus according to claim 1, comprising an additional one way link included in a communication path allowing transmission from the memory to at least one of the computers, without the communication path passing through the encryption processor.

10. The apparatus according to claim 1, comprising a monitoring processor separate from the encryption processor, which monitors the status of the memory.

11. The apparatus according to claim 1, wherein the archive memory is configured to only receive data encrypted by the encryption processor.

12. The apparatus according to claim 1, wherein the archive memory is located within a private protected computer network such that data can be transmitted to the archive memory only from computers within the private protected network.

13. A method for data storage, comprising:
receiving data transmitted from one or more computers for storage in an archive memory centrally archiving data for a plurality of computers;
encrypting the received data using an encryption processor before passing the data to the archive memory;
conveying the encrypted data from the encryption processor to the archive memory over a one-way link, which permits the encryption processor to write the encrypted data to the memory but not to read from the memory,
wherein the one-way link is physically configured so as to permit data transmission in only one direction, from the processor to the memory, and wherein the memory and the encryption processor are connected in a manner allowing direct transmission only from the encryption processor to the memory, and not from the memory to the encryption processor; and
storing the encrypted data in the memory.

14. The method according to claim 13, wherein encrypting the received data comprises encrypting the data using an encryption key that is not available to the one or more computers.

15. The method according to claim 14, wherein encrypting the data comprises, for each transmission of the data from the one or more computers, selecting the encryption key from among a plurality of possible encryption keys, and conveying an indication of the selected encryption key to the memory in addition to the encrypted data.

16. The method according to claim 13, wherein storing the encrypted data comprises writing the encrypted data to the memory without decryption prior to storage.

17. The method according to claim 13, wherein receiving the data comprises receiving the data from the one or more computers over a network.

18. The method according to claim 13, and comprising applying a time stamp to each of at least some items of the data that are written to the memory.

19. The method according to claim 13, and comprising:
generating an indication of a status of the data stored in the memory using a monitoring processor coupled to the memory; and
conveying the indication from the monitoring processor to at least one of the computers via a further one-way link, which permits the monitoring processor so to convey the indication of the status to the at least one of the computers but not to receive inputs from the one or more computers.

20. The method according to claim 13, wherein the memory and the encryption processor are connected directly only by the one way link.

* * * * *